US008056316B2

(12) United States Patent
Poline

(10) Patent No.: US 8,056,316 B2
(45) Date of Patent: Nov. 15, 2011

(54) PROCESS FOR OPTIMIZING THE ENERGY OF A COMBINED HEAT AND POWER GENERATION SITE

(75) Inventor: Tanguy Poline, Sucy-En-Brie (FR)

(73) Assignee: L'Air Liquide Societe Anonyme pour l'Etude Et l'Exploitation des Procedes Georges Claude, Paris (FR)

( * ) Notice: Subject to any disclaimer, the term of this patent is extended or adjusted under 35 U.S.C. 154(b) by 645 days.

(21) Appl. No.: 12/018,328

(22) Filed: Jan. 23, 2008

(65) Prior Publication Data
US 2008/0178604 A1    Jul. 31, 2008

(30) Foreign Application Priority Data

Jan. 25, 2007   (FR) ...................................... 07 52874

(51) Int. Cl.
*F02C 6/00*         (2006.01)
*F02G 1/00*         (2006.01)
*F02G 3/00*         (2006.01)
(52) U.S. Cl. ................... 60/39.182; 60/39.511; 122/7 R
(58) Field of Classification Search ............... 60/39.511, 60/39.182, 784, 780, 39.12, 39.5, 39.52, 60/39.464; 122/7 R, 7 B
See application file for complete search history.

(56) References Cited

U.S. PATENT DOCUMENTS

| | | | |
|---|---|---|---|
| 2,471,755 A | 5/1949 | Karrer | |
| 3,118,429 A | 1/1964 | Hochmuth | |
| 3,704,586 A * | 12/1972 | Bruns | 60/39.182 |
| 4,462,206 A | 7/1984 | Aguet | |
| 5,285,629 A * | 2/1994 | Gounder | 60/39.12 |
| 5,622,043 A * | 4/1997 | Humphries, Jr. | 60/39.182 |
| 5,634,329 A * | 6/1997 | Andersson et al. | 60/776 |
| 5,666,801 A * | 9/1997 | Rohrer | 60/781 |
| 5,678,401 A * | 10/1997 | Kimura | 60/39.182 |
| 5,724,807 A * | 3/1998 | Schuetzenduebel et al. | 60/39.464 |
| 5,794,431 A * | 8/1998 | Utamura et al. | 60/783 |
| 6,145,295 A * | 11/2000 | Donovan et al. | 60/783 |
| 6,604,354 B2 * | 8/2003 | Oto et al. | 60/39.182 |
| 6,945,052 B2 * | 9/2005 | Frutschi et al. | 60/772 |
| 7,284,363 B2 * | 10/2007 | Kung et al. | 60/39.182 |
| 2006/0042259 A1 * | 3/2006 | Marushima et al. | 60/772 |
| 2006/0260290 A1 | 11/2006 | Rao | |

FOREIGN PATENT DOCUMENTS

GB         899904        6/1962

* cited by examiner

Primary Examiner — William Rodriguez
(74) Attorney, Agent, or Firm — Elwood L. Haynes

(57) ABSTRACT

The invention relates to a process for producing power, heat and steam employing:
  a cogeneration unit comprising:
    a gas turbine producing power and combustion gases and
    a heat recovery unit fed with water and heating said water by recovering the heat from the combustion gases from the gas turbine; and
  a steam production unit heating water by combustion of a fuel with air,
and in which the air for the steam production unit is preheated at least partly by heat exchange with the water that feeds the heat recovery unit of the cogeneration unit.

6 Claims, 1 Drawing Sheet

PROCESS FOR OPTIMIZING THE ENERGY OF A COMBINED HEAT AND POWER GENERATION SITE

CROSS REFERENCE TO RELATED APPLICATIONS

This application claims the benefit of priority under 35 U.S.C. §119(a) and (b) to French Application No. 0752874, filed Jan. 25, 2007, the entire contents of which are incorporated herein by reference.

BACKGROUND

1. Field of the Invention

The present invention relates to a process for optimizing the energy of a combined heat and power generation site.

2. Description of Related Art

Large industrial cites use base commodities, namely mechanical or electrical power on the one hand, and steam or hot water on the other. On many sites, these commodities are produced on site in neighbouring cogeneration and steam or hot-water production units.

The object of the present invention is to propose the integration of a cogeneration plant with a heat recovery boiler and of a neighbouring steam production unit so as to optimize the overall energy efficiency of the two units.

SUMMARY OF THE INVENTION

For this purpose, the invention relates to a process for producing power, heat and steam employing;
 a cogeneration unit comprising:
  a gas turbine producing power and combustion gases and
  a heat recovery unit fed with water and heating said water by recovering the heat from the combustion gases from the gas turbine; and
 a steam production unit heating water by combustion of a fuel with air,
and in which the air for the steam production unit is preheated at least partly by heat exchange with the water that feeds the heat recovery unit of the cogeneration unit.

The invention therefore relates to a process employed on an industrial site comprising both a cogeneration unit and a steam production unit.

The cogeneration unit comprises a gas turbine producing mechanical or electrical power by expansion of combustion gas. The heat of these combustion gases is recovered in a heat recovery unit intended to produce steam or hot water. This heat recovery unit is generally a boiler in which the heat of the combustion gas is from the gas turbine heats the water introduced into the boiler. The combustion gases from the turbine may also be used as oxidizer if they still contain oxygen and if a fuel is introduced into the heat recovery unit—this is then referred to as post-combustion. In general, the heat recovery unit is fed with water that is already hot—the terms "hot water" is understood to mean water having a temperature of at least 105° C.

The steam production unit is usually a boiler in which a fuel is burnt in the presence of air in order to release heat. This heat then heats water so as to obtain steam.

According to the invention, the air introduced into the boiler of the steam production unit is heated prior to its introduction into the boiler by heat exchange with the water intended to feed the heat recovery unit of the cogeneration unit. Preferably, the temperature of the water for the heat recovery unit of the cogeneration unit is at least 20° C., more preferably at least 30° C. and even at least 50° C. above that of the air to be preheated for the steam production unit.

The invention may be implemented with the following preferred arrangements:
 the water that feeds the heat recovery unit is heated by steam;
 the water that feeds the heat recovery unit is heated by steam derived from the stream produced by the steam production unit and/or by the heat recovery unit of the cogeneration unit, advantageously by low-pressure steam produced by these units;
 the steam that feeds the heat recovery unit is heated by steam by means of a degasifier;
 the water that feeds the heat recovery unit is heated by means of a degasifier by steam derived from the steam production unit and/or from the heat recovery unit of the cogeneration unit. The degasifier makes it possible to bring water to be preheated into contact with steam so as to preheat the water and simultaneously to remove the oxygen dissolved in this water; and
 the air introduced into the steam production unit is also partly heated by heat exchange with steam produced by said steam production unit and/or by the heat recovery unit of the cogeneration unit. Preferably, the air is heated by means of low-pressure or medium-pressure steam. It is also preferable for the air that feeds the boiler of the steam production unit to be heated by steam after the air for the steam production unit has been preheated by heat exchange with the water that feeds the heat recovery unit of the cogeneration unit.

DETAILED DESCRIPTION OF THE INVENTION

Figure 1:
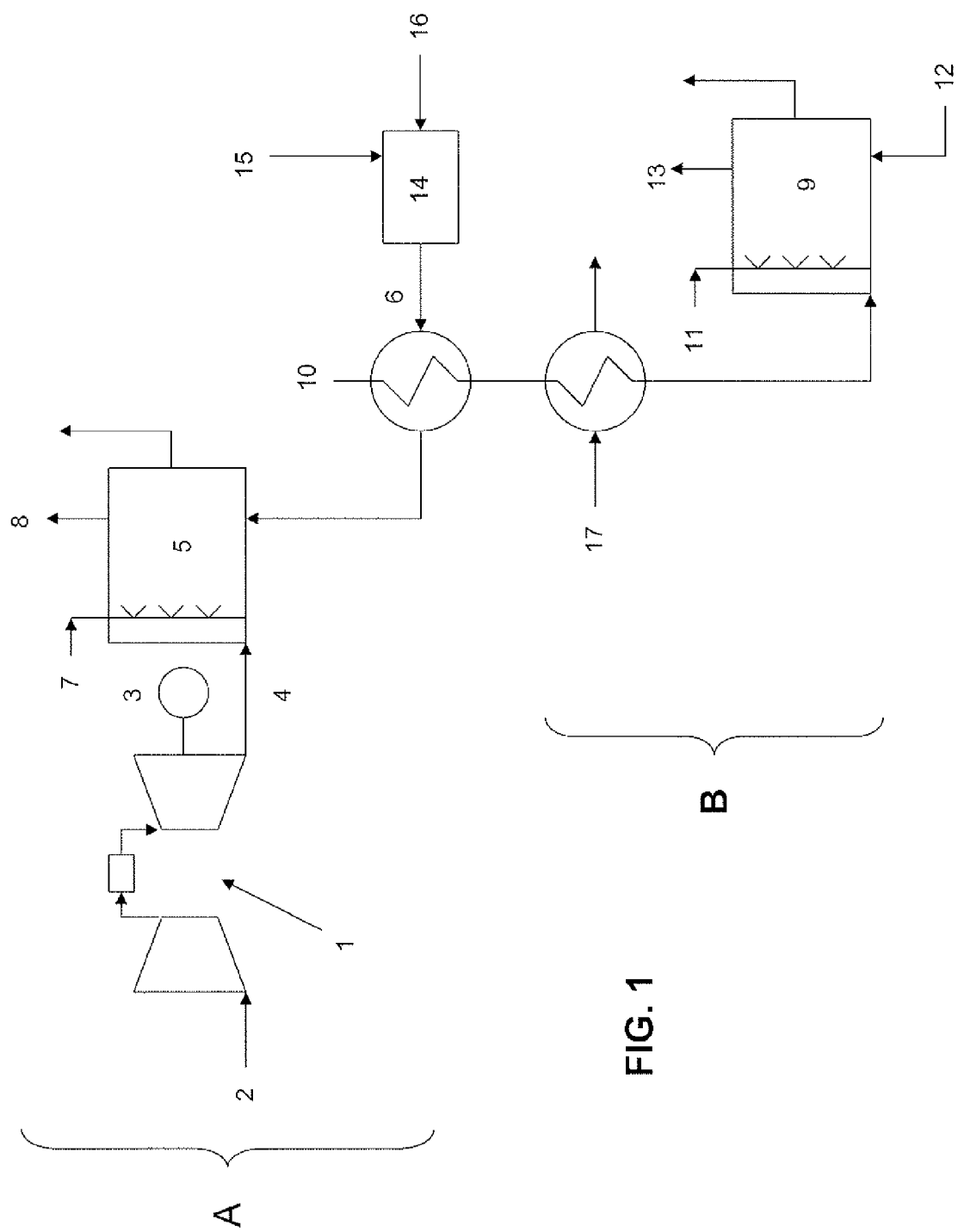
FIG. 1 illustrates a process according to one embodiment of the present invention.

For a further understanding of the nature and objects for the present invention, reference should be made to the detailed description, taken in conjunction with the accompanying drawing, in which like elements are given the same or analogous reference numbers and wherein.

The invention is illustrated by FIG. 1. The industrial site illustrated comprises a cogeneration unit A and a steam production unit B. In the cogeneration unit A, the gas turbine 1 is fed with a fuel 2. It produces mechanical or electrical power 3 and hot combustion flue gases 4. These combustion flue gases 4 are introduced into a heat recovery unit 5 in order to utilize their heat. The heat recovery unit 5 is fed with water 6, this water being heated by combustion of a fuel 7 with the oxygen remaining in the combustion fuel gases 4. This heat recovery unit 5 produces steam 8. The water 6 is obtained by heating cold water 16 in a degasifier 14 fed with steam 15. The steam production unit B comprises a boiler 9 for heating water 12 by combustion of a fuel 11 with air 10. The boiler 9 produces steam 13. The air 10 is preheated by heat exchange with the water 6 for the heat recovery unit 5 and then by heat exchange with steam 17.

The steam 15 and 17 used for heating the water 16 for the heat recovery unit 5 and for heating the air 10 for the boiler preferably is low-pressure or medium-pressure steam derived from the high-pressure steam 8 and 13 produced by the heat recovery unit 5 and by the boiler 9.

The process according to the invention makes it possible to reduce the steam consumption needed for heating the air for the steam production boiler by recovering the heat from the water intended to feel the heat recovery unit. At the same time, it has been observed that there is only a very slight reduction in steam production by the heat recovery unit. Overalls the process according to the invention makes it possible to save 10% of the steam used for the process for the prior art without heat exchange between the air for the steam production unit and the water that feeds the heat recovery unit of the cogeneration unit.

The invention has been carried out on an industrial site reproducing the diagram of FIG. 1. The temperature of the water intended to be introduced into the heat recovery unit was 148° C. and the temperature of the air intended to be introduced into the steam production unit was 10° C. Heat exchange between these two fluids was carried out so as to bring the temperature of the water intended to be introduced into the heat recovery unit to 68° C. By preheating the air intended to be introduced into the steam production unit, it was possible to save 10 t/h of steam at a pressure of 4 bar for heating this air. On the downside, the heat recovery unit of the cogeneration unit produced less high-pressure steam but only from 69.7 t/h to 69 t/h.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for producing power, heat and steam employing:
   a cogeneration unit comprising:
   a gas turbine producing power and combustion gases and
   a heat recovery unit fed with water and heating said water by recovering the heat from the combustion gases from the gas turbine; and
   a steam production unit heating water by combustion of a fuel with air, and in which the air for the steam production unit is preheated at least partly by heat exchange with the water that feeds the heat recovery unit of the cogeneration unit, wherein the water that feeds the heat recovery unit is heated by steam, through the means of a degasifier.

2. The process of claim 1, characterized in that the temperature of the water for the heat recovery unit of the cogeneration unit is at least 20° C. higher than that of the air for the steam production unit to be preheated.

3. The process of claim 1, characterized in that the temperature of the water for the heat recovery unit of the cogeneration unit is at least 30° C. higher than that of the air for the steam production unit to be preheated.

4. The process of claim 1, characterized in that the degasifier steam is derived from the steam produced by the steam production unit and/or by the heat recovery unit of the cogeneration unit.

5. The process of claim 1, characterized in that the air that feeds the steam production unit is partly heated by heat exchange with steam produced by said steam production unit and by the heat recovery unit of the cogeneration unit.

6. The process of claim 5, characterized in that the air that feeds the steam production unit is heated by steam after the air for the stream production unit has been preheated by heat exchange with the water that feeds the heat recovery unit of the cogeneration unit.

* * * * *